US009782899B2

(12) United States Patent
Chiu et al.

(10) Patent No.: US 9,782,899 B2
(45) Date of Patent: Oct. 10, 2017

(54) CALIBRATION METHOD FOR COORDINATE SYSTEM OF ROBOT MANIPULATOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Long-En Chiu, New Taipei (TW); Yong Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 366 days.

(21) Appl. No.: 14/687,045

(22) Filed: Apr. 15, 2015

(65) Prior Publication Data
US 2015/0314450 A1    Nov. 5, 2015

(30) Foreign Application Priority Data

Apr. 30, 2014    (CN) .......................... 2014 1 0179964

(51) Int. Cl.
*G06F 19/00*    (2011.01)
*G05B 19/04*    (2006.01)
*G05B 19/18*    (2006.01)
*B25J 9/16*    (2006.01)

(52) U.S. Cl.
CPC ...... *B25J 9/1692* (2013.01); *G05B 2219/39021* (2013.01); *G05B 2219/39026* (2013.01); *Y10S 901/02* (2013.01)

(58) Field of Classification Search
None
See application file for complete search history.

(56) References Cited

U.S. PATENT DOCUMENTS 4,763,276 A * 8/1988 Perreirra ................ B25J 9/1653
700/254
4,825,394 A * 4/1989 Beamish ................ B25J 9/1697
356/147

(Continued)

*Primary Examiner* — Ronald Hartman, Jr.
(74) *Attorney, Agent, or Firm* — Steven Reiss

(57) ABSTRACT

A calibration method for a coordinate system of a workpiece held by a robot manipulator, which includes the following steps: setting a predicted coordinate system on the workpiece; controlling the drive mechanism to drive the workpiece to move a specific distance along a coordinate axis in the predicted coordinate system and measuring the distance change of the workpiece in a direction perpendicular to the move; using the measured distance change to determine an orientation error between the predicted coordinate system and the actual coordinate system; correcting the orientation parameters of the predicted coordinate system; controlling the drive mechanism to drive the workpiece to rotate by a specific angle around a coordinate axis of the predicted coordinate system and measuring the distance change after being rotated; using the measured distance change to determine a position error; correcting the position parameters of the predicted coordinate system.

12 Claims, 12 Drawing Sheets

(56) References Cited

U.S. PATENT DOCUMENTS

| | | | | |
|---|---|---|---|---|
| 4,831,549 A * | 5/1989 | Red | | B25J 9/1692 700/254 |
| 4,969,108 A * | 11/1990 | Webb | | G05B 19/425 219/124.34 |
| 5,297,238 A * | 3/1994 | Wang | | B25J 9/1692 700/254 |
| 5,724,264 A * | 3/1998 | Rosenberg | | G01B 5/008 700/161 |
| 5,838,882 A * | 11/1998 | Gan | | B25J 9/1694 700/259 |
| 6,078,876 A * | 6/2000 | Rosenberg | | G01B 5/008 700/195 |
| 6,681,151 B1 * | 1/2004 | Weinzimmer | | B25J 9/1697 219/121.85 |
| 6,697,748 B1 * | 2/2004 | Rosenberg | | B25J 9/1692 700/195 |
| 7,395,606 B2 * | 7/2008 | Crampton | | B25J 13/088 33/503 |
| 7,853,359 B2 * | 12/2010 | Ban | | B25J 9/1692 318/568.11 |
| 8,266,940 B2 * | 9/2012 | Riemeier | | A61C 7/20 72/306 |
| 8,805,584 B2 * | 8/2014 | Yamane | | B25J 9/1692 700/245 |
| 9,156,162 B2 * | 10/2015 | Suzuki | | B25J 9/16 |
| 9,221,176 B2 * | 12/2015 | Suzuki | | B25J 9/1692 |
| 9,248,573 B2 * | 2/2016 | Soe-Knudsen | | B25J 9/1656 |
| 9,279,661 B2 * | 3/2016 | Tateno | | G01B 11/002 |
| 2008/0188983 A1 * | 8/2008 | Ban | | B25J 9/1692 700/245 |
| 2010/0234993 A1 * | 9/2010 | Seelinger | | B25J 9/1697 700/254 |
| 2013/0011018 A1 * | 1/2013 | Tateno | | G01B 11/002 382/106 |
| 2013/0079928 A1 * | 3/2013 | Soe-Knudsen | | B25J 9/1656 700/248 |
| 2014/0229005 A1 * | 8/2014 | Suzuki | | B25J 9/1692 700/254 |
| 2015/0266183 A1 * | 9/2015 | Alifragkis | | B25J 9/1692 700/254 |

* cited by examiner

CALIBRATION METHOD FOR COORDINATE SYSTEM OF ROBOT MANIPULATOR

FIELD

The subject matter herein generally relates to a calibration method for a robot manipulator, and particularly for a coordinate system of the robot manipulator.

BACKGROUND

Robot manipulators are used in various industrial fields to fulfill the requirements for product assembling, welding, polishing and other tasks automatically. A robot manipulator of related art may be equipped with a tool, such as a gripper, a cutting device, a glue dispenser, a polisher or a fixture mounted to a distal end. The robot controller can use the robot manipulator's design parameters to compute the motion required to drive its distal end to a specified position and orientation. To drive a mounted tool to a specified position and orientation, additional information on the geometric relationship between the tool and the manipulator's distal end is required. For example, when a robot manipulator polishes products, the robot manipulator may be commanded to move a polishing tool across the various surfaces of a stationary workpiece; the polishing accuracy depends on an operating accuracy of a robot tool coordinate system that defines the position and orientation of the tool relative to the robot manipulator's distal end. Thus, the operating accuracy of the robot tool coordinate system becomes an important performance factor of the robot manipulator. However, the tool's manufacturing variances, mounting imprecision, or damage during collision, can cause errors in the robot tool coordinate system. Manual calibration of the tool coordinate system is time-consuming and inconvenient, and the precision of manual calibration is not guaranteed.

Similarly, if a robot manipulator performs polishing by holding a workpiece and moving the workpiece's surfaces across a stationary polishing tool, then the polishing accuracy depends on an operating accuracy of a robot coordinate system that defines the position and orientation of the held workpiece relative to the robot manipulator's distal end. In effect, the held workpiece becomes the "tool" that needs to be calibrated. This disclosure provides a means to automatically calibrate a robot coordinate system that defines the position and orientation of a workpiece held by a robot manipulator.

BRIEF DESCRIPTION OF THE DRAWINGS

Implementations of the present technology will now be described, by way of example only, with reference to the attached figures.

DETAILED DESCRIPTION

Figure 1:
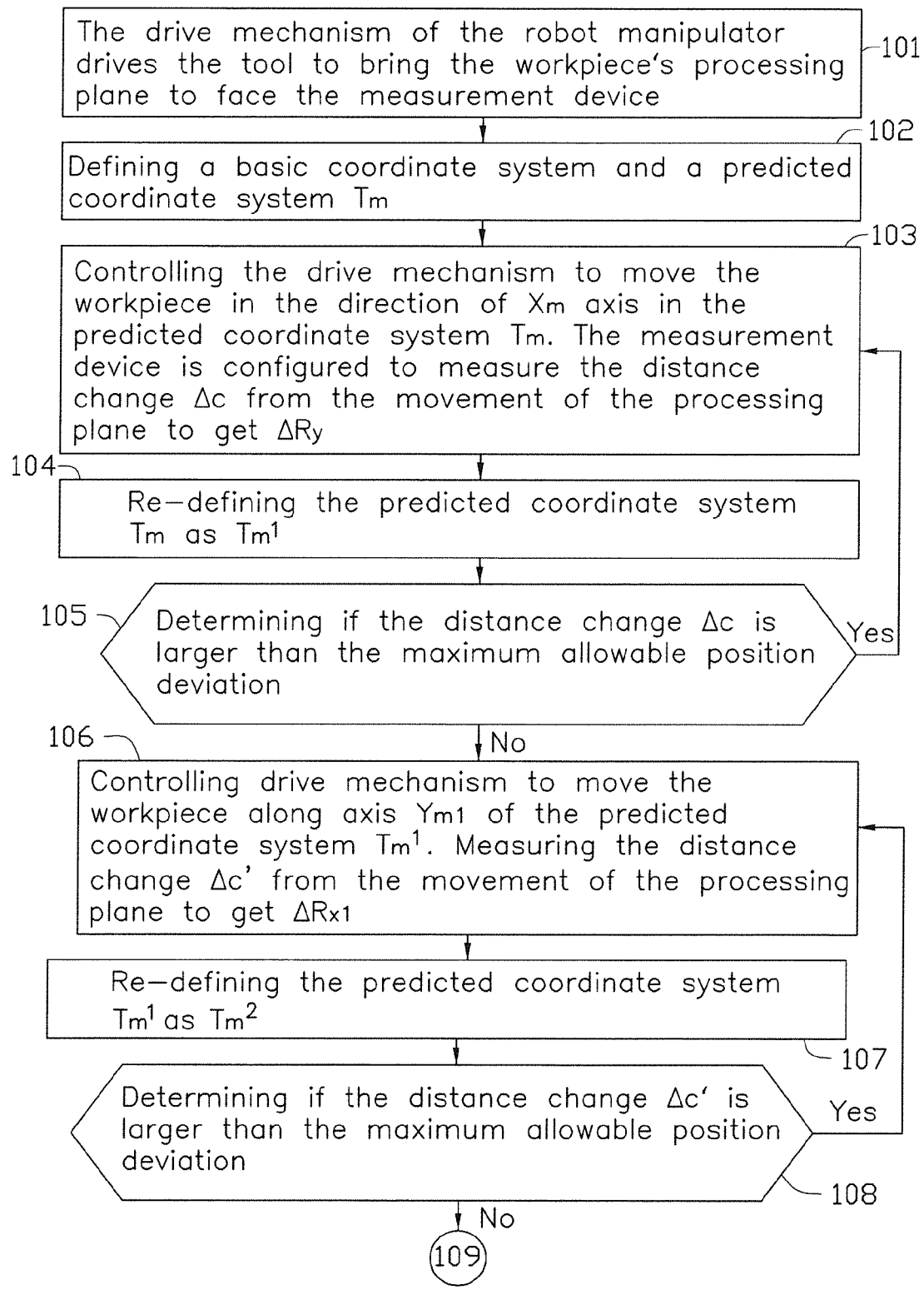
FIG. 1 to FIG. 3 is a flow diagram illustrating a calibration method for a workpiece coordinate system of a robot manipulator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a calibration method with high calibration accuracy and simple calibration operation for a robot coordinate system of a robot manipulator.

Operating a robot manipulator usually requires mounting a tool, such as a gripper, a cutting device, a glue dispenser, a polisher, a clamp or a fixture, on a distal end of the robot manipulator. Most applications involve driving the tool to specific positions and orientations in 3D workspace to interact with a stationary workpiece. However, in some applications, a workpiece is held by a gripper, clamp or fixture mounted on the robot, and the robot is commanded to drive the workpiece to specific positions and orientations in 3D workspace to interact with a stationary tool, such as a fixed polisher or fixed laser beam. In these applications, the workpiece becomes an extension of the gripping tool mounted on the distal end of the manipulator. Due to the gripping tool's manufacturing variances, mounting imprecision, or damage during collision, as well as imprecision in how the workpiece is seated within the gripping tool, the position and orientation of the held workpiece are not known precisely. To accurately drive the workpiece to specified positions and orientations in 3D workspace, calibration of the position and orientation of the held workpiece relative to the robot manipulator's distal end is required.

The position and orientation of a workpiece are defined by a coordinate system affixed to the workpiece; all points on the workpiece are then referenced relative to this workpiece coordinate system. For the workpiece coordinate system, a corner point or a center point of the workpiece is often defined as the coordinate origin, and the coordinate axes are typically defined to align with orthogonal edges of the workpiece. When a robot manipulator is holding a workpiece, driving the workpiece to a specified position and orientation in 3D workspace requires knowledge of the position and orientation of the workpiece coordinate system relative to the robot manipulator's distal end. Here we disclose an automated calibration procedure through which the robot controller can accurately determine the position and orientation of the workpiece coordinate system relative to the robot's distal end by driving the held workpiece towards a distance or displacement measurement device. The workpiece is assumed to be rectangular in shape and the origin of the workpiece coordinate system is assumed to be at the center point of the primary surface to be processed. If the workpiece is not rectangular, a rectangular calibration block can be fabricated based on the bounding length, width and height of the actual workpiece; the calibration procedure is then performed with the robot manipulator holding the rectangular calibration block, which will determine the location and orientation of a workpiece coordinate system affixed to the center of the primary surface of the workpiece's rectangular bounds. The location and orientation of the actual workpiece coordinate system can then be calculated from workpiece design data as an offset from the center of the primary surface of the workpiece's rectangular bounds.

Figure 2:
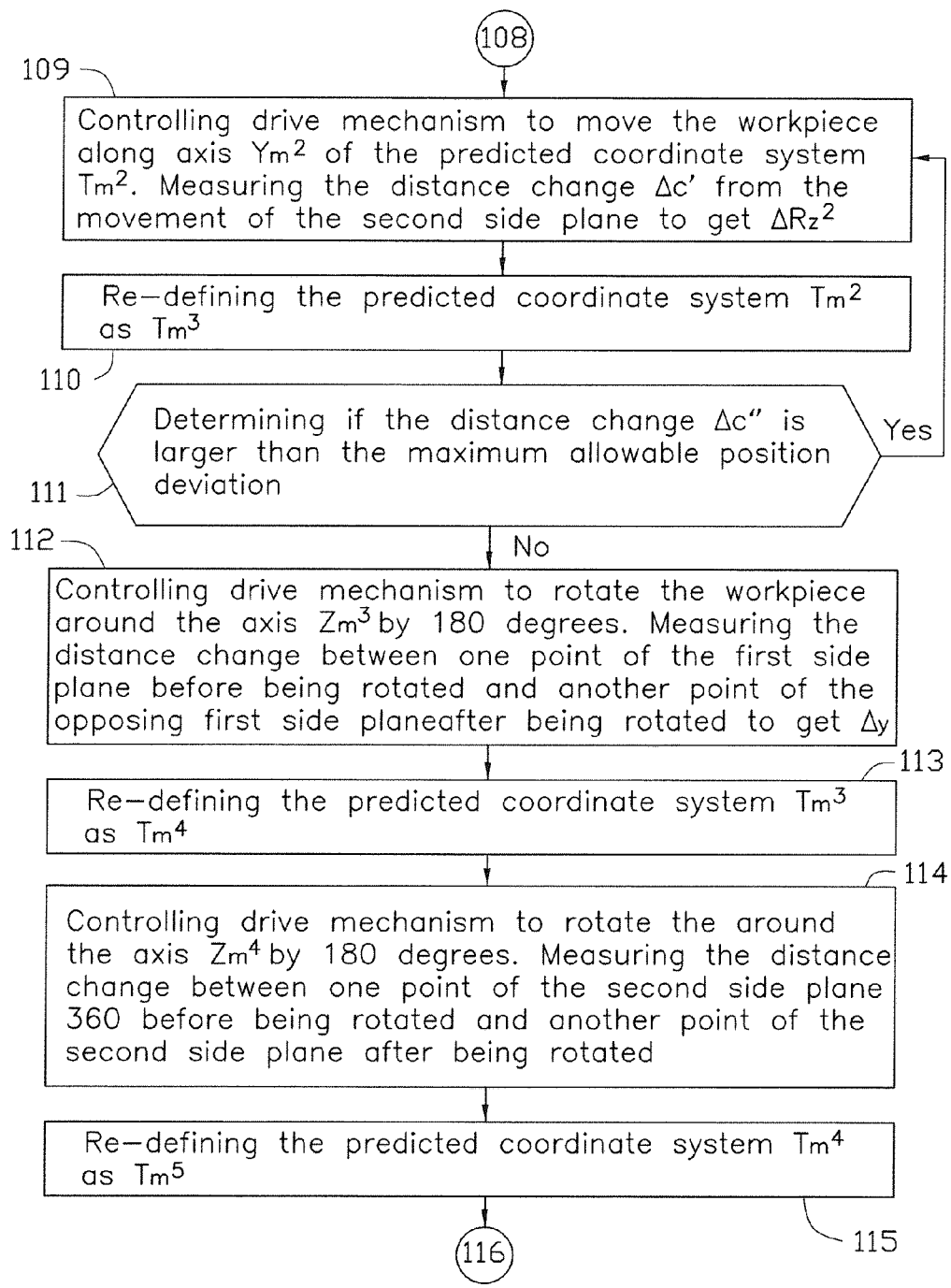
Figure 3:
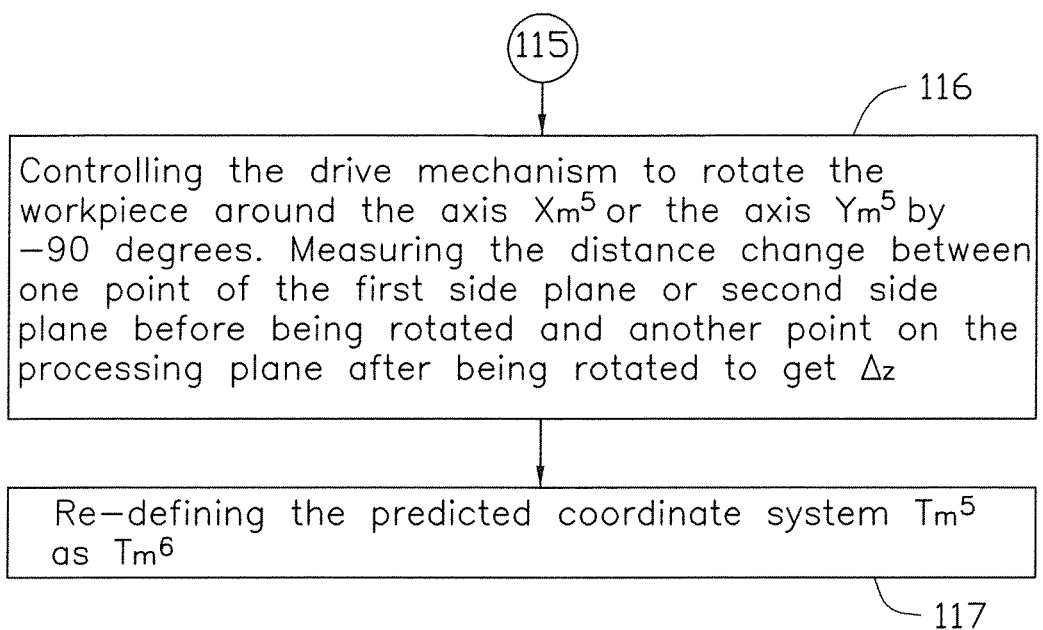

Referring to FIG. 1, FIG. 2 and FIG. 3, a flowchart is presented in accordance with an example embodiment which is being thus illustrated. The example method for calibrating a coordinate system for a workpiece 300 is provided by way of example, as there are a variety of ways to carry out the method. The method described below can be carried out using the configurations illustrated in FIG. 4 to FIG. 12, for example, and various elements of these figures are referenced in explaining example method. Each block shown in FIG. 1, FIG. 2 and FIG. 3 represents one or more processes, methods or subroutines, carried out in the example method. Additionally, the illustrated order of blocks is by example only and the order of the blocks can change according to the present disclosure.

Figure 4:
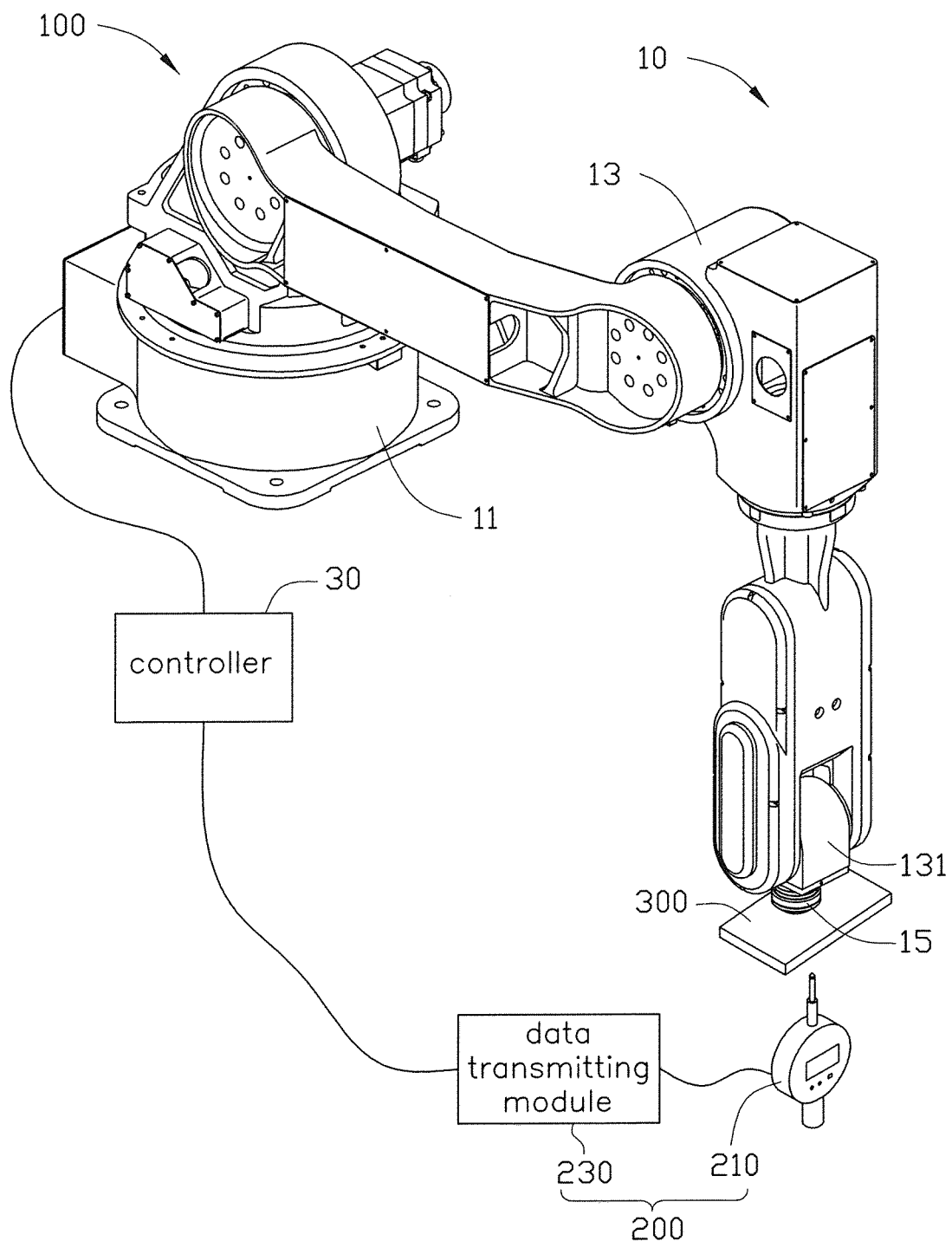
FIG. 4 illustrates an embodiment of a robot manipulator.

FIG. 4 illustrates an embodiment of a robot manipulator 100 together with an assistant measurement tool 200 for calibrating a coordinate system for a workpiece 300 and related method of the embodiment. The robot manipulator 100 comprises a main body 10, a controller 30 connected to the main body 10. The main body 10 comprises a base 11, a drive mechanism 13 mounted on the base, and a tool 15. The drive mechanism 13 includes all physical components (such as motors, gears, and mechanical linkages) required to move the tool 15. The tool 15 is assembled to a side of the end mechanical linkage 131 of the drive mechanism 13. The controller 30 includes a control software (not shown and not illustrated) and controls the drive mechanism 13 to move the tool 15 along a specified course. In the embodiment, the robot manipulator 100 is a six-axis robot. The drive mechanism 13 is a multiple-axis drive mechanism. The tool is a pneumatic gripper.

The assistant measurement tool 200 comprises a measurement device 210 and a data transmitting module 230. The measurement device 210 is set on a horizontal plane next to the robot manipulator 100 and is configured to measure a moving distance of the work piece 300. In the embodiment, the measurement device 210 can be a probe indicator, a laser displacement meter or other displacement measurement devices. The data transmitting module 230 is a device that transmits the measured values to the controller 30.

The workpiece 300 is usually a rectangular plate which comprises an attachment plane 310, a processing plane 320 at the opposite side of the attachment plane 310, a first side plane 340 connected to the attachment plane 310 and the processing plane 320, and a second side plane 360 connected to the first side plane 340.

In the embodiment of the method for calibrating a coordinate system.

In block 101 in FIG. 1, the tool 15 is connected to the attachment plane 310 of the workpiece 300. The drive mechanism 13 of the robot manipulator 100 drives the tool 15 to bring the workpiece 300 to the top of the measurement device 210 and moves the processing plane 320 of the workpiece 300 toward the measurement device 210.

Figure 5:
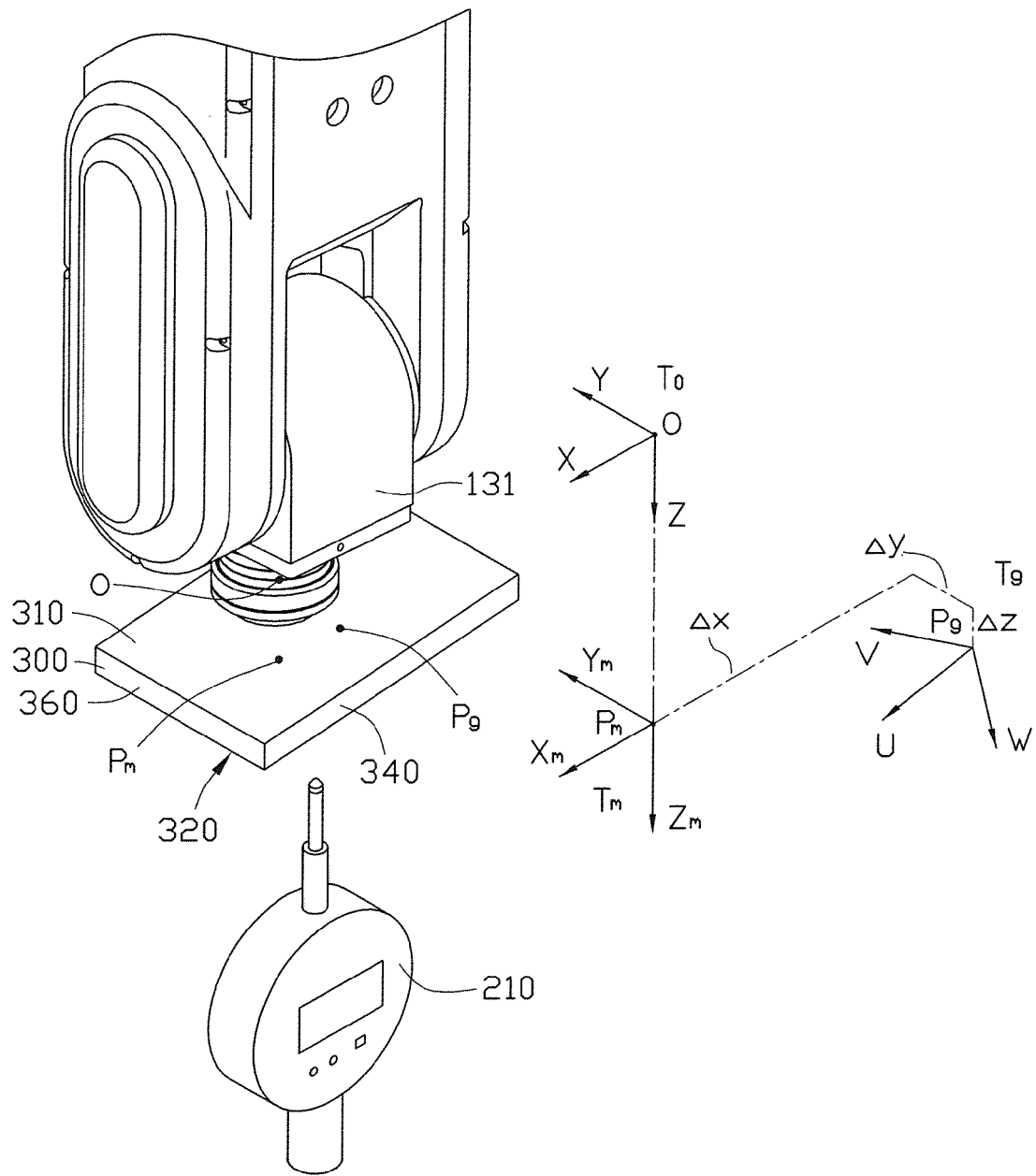
FIG. 5 illustrates a partially enlarged drawing of the robot manipulator of FIG. 4.

FIG. 5 and block 102 in FIG. 1 illustrate a coordinate system is defined. The end mechanical linkage 131 of the robot manipulator 100 typically has a flange at the distal end for attaching a tool, and includes a basic tool coordinate system $T_0$. The origin of the basic tool coordinate system $T_0$ is located at the center of the flange. The basic tool coordinate system's origin is O (0, 0, 0), and its coordinate axes are X axis, Y axis and Z axis. The direction of the Y axis is from the center of the flange to a predefined point at the perimeter of the flange. The direction of the Z axis is perpendicular to the plane of the flange, pointing away from the flange. The direction of the X axis can be determined from the right-hand rule. When the robot manipulator holds a workpiece, the position and orientation of the held workpiece relative to the basic tool coordinate system $T_0$ is only known approximately. The object of the disclosure is to correct the workpiece's position and orientation relative to $T_0$ from approximate estimated values to highly accurate values.

In order to obtain the true position and orientation of the workpiece 300 relative to the basic tool coordinate system $T_0$, a predicted workpiece coordinate system $T_m$ is set based on the approximate position where the robot manipulator 100 holds the workpiece 300. The origin of the predicted workpiece coordinate system is $P_m$. The axes of the predicted workpiece coordinate system $T_m$ are $X_m$ axis, $Y_m$ axis and $Z_m$ axis. The position of $P_m$ relative to the basic coordinate system $T_0$ is $P_m$ ($X_m$, $Y_m$, $Z_m$). The orientation of the predicted workpiece coordinate system $T_m$ relative to the basic coordinate system $T_0$ is given by the rotation angles $R_x$, $R_y$, and $R_z$, wherein, assuming $T_m$ initially coincides with $T_0$ and rotated around the coordinate axes of $T_0$ to reach its present orientation, $R_x$ is the angular change when $T_m$ rotates around the X axis, $R_y$ is the angular change when $T_m$ rotates around the Y axis, and $R_z$ is the angular change when $T_m$ rotates around the Z axis. The parameters ($X_m$, $Y_m$, $Z_m$, $R_x$, $R_y$, $R_z$) of the predicted workpiece coordinate system $T_m$ are set in a controller. According to this embodiment, the $X_m$ axis, the $Y_m$ axis and the $Z_m$ axis are initially parallel to the X axis, the Y axis and the Z axis, respectively. In our calibration procedure, the robot manipulator rotates the workpiece around the predicted workpiece coordinate axes of $T_m$ with the assumption that the actual position and orientation of the workpiece is given by ($X_m$, $Y_m$, $Z_m$, $R_x$, $R_y$, $R_z$); the resultant movements of the workpiece are measured and compared with the expected movements if the predicted parameter values are correct; the errors observed between the actual and expected movements are used to adjust the parameters ($X_m$, $Y_m$, $Z_m$, $R_x$, $R_y$, $R_z$) to reflect the true position and orientation of the workpiece relative to the basic coordinate system $T_0$.

The origin of the actual workpiece coordinate system $T_g$ on the workpiece 300 is $P_g$. The axes of the actual workpiece coordinate system $T_g$ are U axis, V axis and W axis. Assuming a rectangular workpiece 300 (or the use of a rectangular calibration block 300 to mimic the bounding length, width and height of the workpiece), the origin $P_g$ of the actual workpiece coordinate system $T_g$ is located at the center of the processing plane 320 of the workpiece 300 (facing away from the workpiece holding tool 15 of the robot manipulator). The U axis is parallel to the first side plane 340 of the workpiece 300; the V axis is parallel to the second side plane 360; the W axis is perpendicular to the processing plane 320. We assume there is position error ($\Delta x, \Delta y, \Delta z$) and orientation error ($\Delta R_x, \Delta R_y, \Delta R_z$) between the predicted workpiece coordinate system $T_m$ and the actual workpiece coordinate system $T_g$. If the origin $P_m$ of the predicted workpiece coordinate system $T_m$ is to be moved to the origin $P_g$ of the actual workpiece coordinate system $T_g$, $\Delta x$ is the required position change of $P_m$ along the $X_m$ axis, $\Delta y$ is the required position change of $P_m$ along the $Y_m$ axis, and $\Delta z$ is the required position change of $P_m$ along the $Z_m$ axis. If the $X_m$, $Y_m$ and $Z_m$ axes of the predicted workpiece coordinate system $T_m$ are to be respectively aligned with the U, V and W axes of the actual workpiece coordinate system $T_g$, $\Delta R_x$ is the required angular change when $T_m$ rotates around $X_m$ axis, $\Delta R_y$ is the required angular change when $T_m$ rotates around $Y_m$ axis, and $\Delta R_z$ is the required angular change when $T_m$ rotates around $Z_m$ axis.

Figure 6:
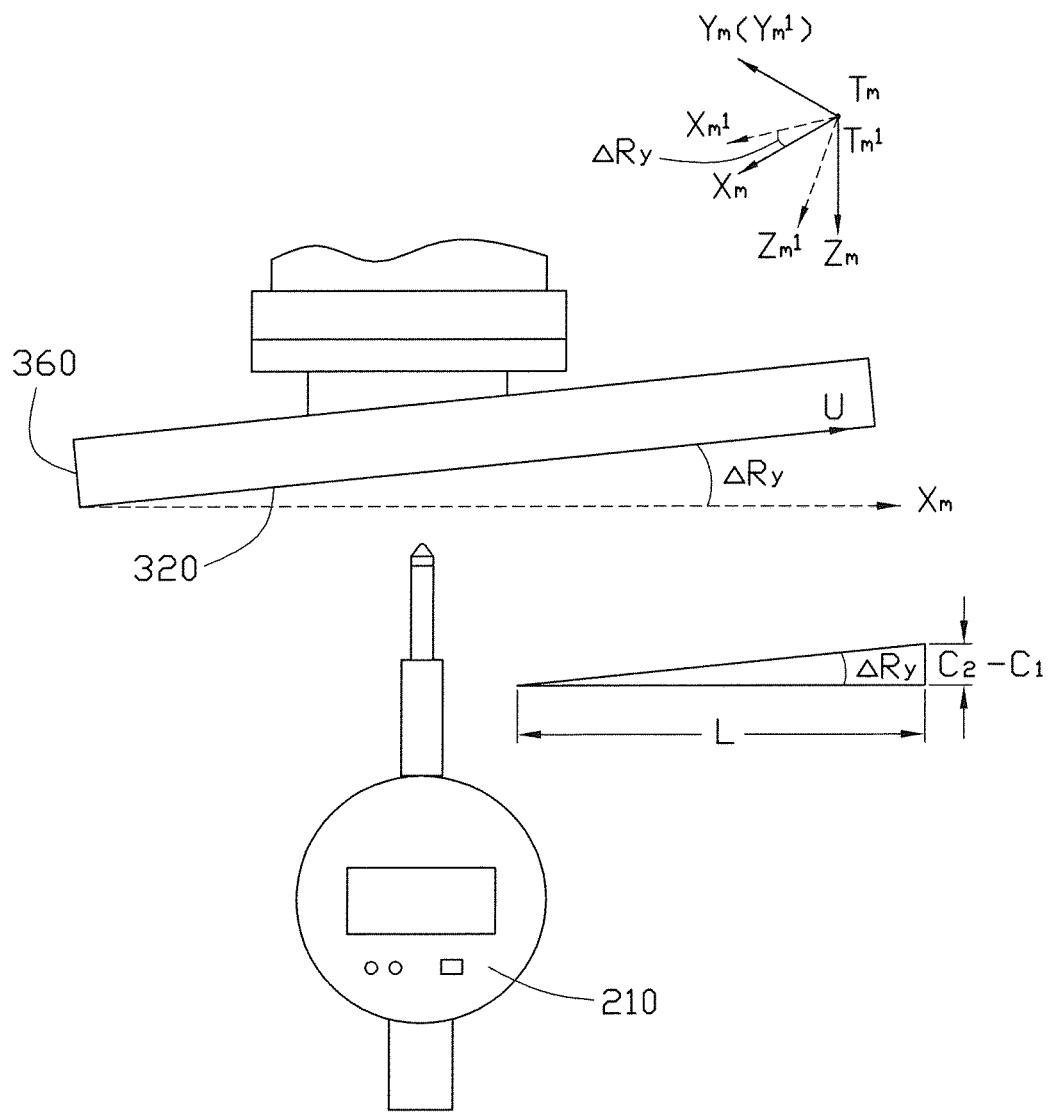
FIG. 6 illustrates a diagrammatic view of the robot manipulator of FIG. 4 when the controller controls the drive mechanism to drive the workpiece in the direction of $X_m$ axis in the predicted coordinate system $T_m$.

FIG. 6 and block 103 in FIG. 1 illustrate that the controller 30 controls the drive mechanism 13 to drive the workpiece 300 in the direction of $X_m$ axis in the predicted workpiece coordinate system $T_m$. The measurement device 210 is configured to measure the distance change from the movement of the processing plane 320 to determine $\Delta R_y$. In the embodiment, the controller 30 is configured to control the drive mechanism 13 to drive the processing plane 320 of the workpiece 300 to contact the measurement device 210 to obtain the first measurement value $c_1$. In the embodiment, the measurement device is a probe indicator, and the measurement value is a probe displacement value. The first measurement value $c_1$ is transmitted to the controller 30 through the data transmitting module 230. The controller 30 then controls the drive mechanism 13 to drive the workpiece 300 a distance L in the direction of $X_m$ axis in the predicted workpiece coordinate system $T_m$, and causes the processing plane 320 of the workpiece 300 to contact the measurement device 210 at a second point to obtain the second measurement value $c_2$. The second measurement value $c_2$ is transmitted to the controller 30 through the data transmitting module 230. Therefore, as the workpiece is moved a distance L in the direction of the $X_m$ axis, the distance change of the processing plane 320 in the direction perpendicular to the $X_m$ axis is $\Delta c = c_2 - c_1$. The measured distance change indicates the $X_m$ axis of the predicted workpiece coordinate system $T_m$ is not aligned with the actual processing plane 320, and that there exists an orientation error $\Delta R_y$ (a required angular change in the rotation of the predicted workpiece coordinate system $T_m$ around the $Y_m$ axis). The value of $\Delta R_y$ can be calculated according to formula $L \times \tan\Delta R_y = c_2 - c_1$ or $\tan\Delta R_y = (c_2 - c_1)/L$ The method of the distance measurement may be a non-contact distance measurement. For example, the measurement device 210 is a laser sensor.

In block 104, the rotation parameters ($R_x, R_y, R_z$) of the predicted workpiece coordinate system $T_m$ are corrected according to $\Delta R_y$, and the predicted workpiece coordinate system $T_m$ is redefined. In the embodiment, the value of ($R_x, R_y, R_z$) in the control software of controller 30 is modified to rotate the predicted workpiece coordinate system $T_m$ around its $Y_m$ axis by an angular amount $\Delta R_y$, thereby causing the $X_m$ axis to become parallel to the actual processing plane 320. Therefore, the predicted workpiece coordinate system $T_m$ is modified to be a new predicted workpiece coordinate system $T_m^1$ in which the new $X_m$-$Y_m$ plane (the plane formed by the new $X_m$ axis and $Y_m$ axis) is almost parallel to the U-V plane (the plane formed by the U axis and V axis) of the actual workpiece coordinate system $T_g$. The origin of the predicted workpiece coordinate system $T_m^1$ (the first new predicted workpiece coordinate system) is $P_m^1$, and the axes of the predicted workpiece coordinate system $T_m^1$ are $X_m^1, Y_m^1$ and $Z_m^1$, wherein the parameter in controller 30 is ($X_m^1, Y_m^1, Z_m^1, R_x^1, R_y^1, R_z^1$), representing the position and orientation of $T_m^1$ relative to the basic coordinate system $T_0$. The position error between the predicted workpiece coordinate system $T_m^1$ and the actual workpiece coordinate system $T_g$ is ($\Delta x^1, \Delta y^1, \Delta z^1$), and the orientation error between the predicted workpiece coordinate system $T_m^1$ and the actual workpiece coordinate system $T_g$ is ($\Delta R_x^1, \Delta R_y^1, \Delta R_z^1$).

In block 105, the controller 30 determines if the measured distance change $\Delta c$ is larger than the maximum allowable position deviation. If the distance change $\Delta c$ is larger than the maximum allowable position deviation, then block 103 to block 105 is repeated. When repeating block 103 to block 105, the direction for measuring distance change $\Delta c$ may not be perpendicular to the new $X_m$ axis, but the angular error $\Delta R_y$ has become very small such that it can be approximated by the formula $\tan\Delta Ry \sim (c2-c1)/L$. By repeatedly correcting the parameters ($R_x, R_y, R_z$) of the predicted workpiece coordinate system $T_m$ according to $\Delta Ry$, the distance change $\Delta c$ will continue to decrease. If the distance change $\Delta c$ is less than or equal to the maximum allowable position deviation, then the calibration procedure enters block 106. In this embodiment, the maximum allowable position deviation for $\Delta c$ is 0.02 mm.

Figure 7:
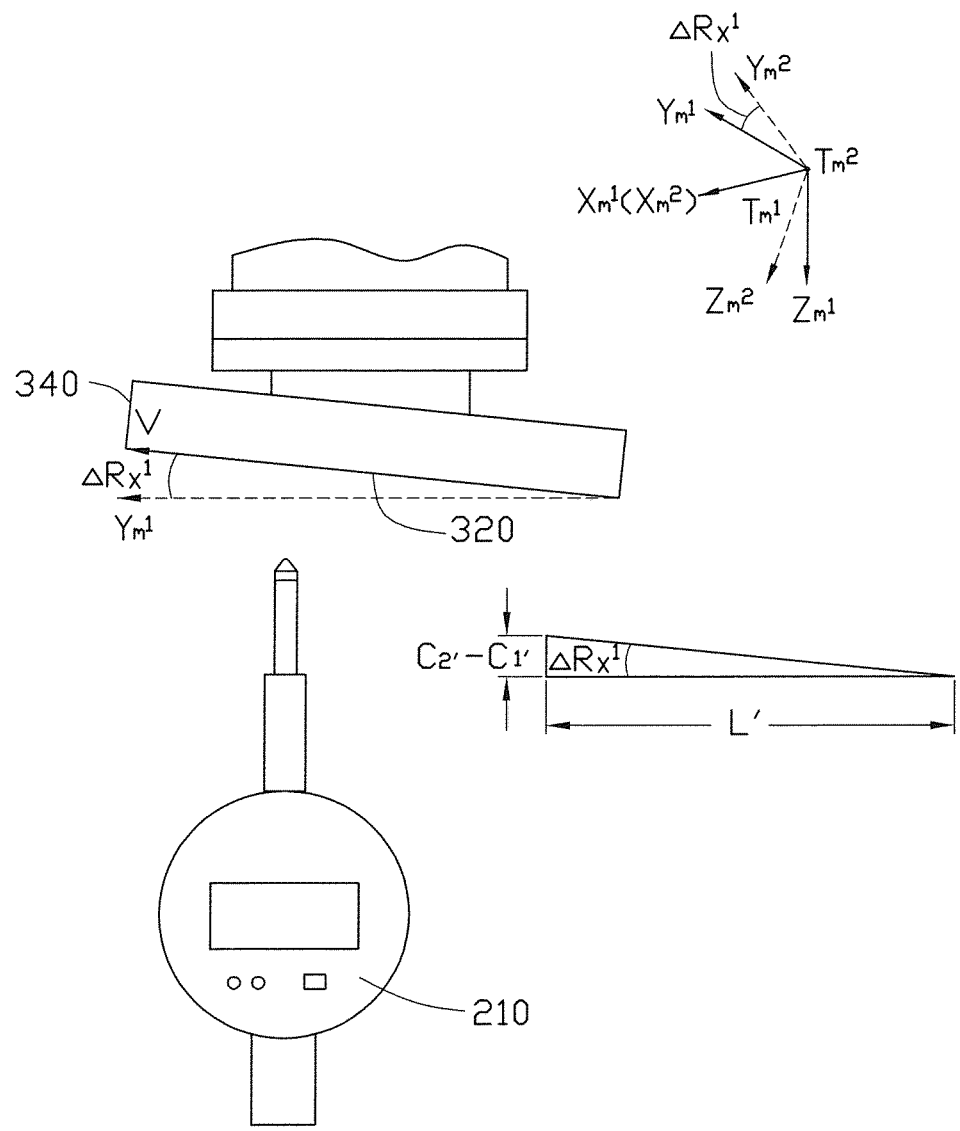
FIG. 7 illustrates a diagrammatic view of the robot manipulator of FIG. 4 when the drive mechanism drives the workpiece to move along axis $Y_m^1$ of the predicted coordinate system $T_m^1$.

FIG. 7 and block 106 in FIG. 1 illustrate that the drive mechanism 13 is controlled by the controller 30 to drive the workpiece 300 to move in the direction of the $Y_m^1$ axis of the predicted workpiece coordinate system $T_m^1$. The distance change from the movement of the processing plane 320 is measured to determine $\Delta R_x^1$. In the embodiment, the controller 30 is configured to control the drive mechanism 13 to drive the processing plane 320 of the workpiece 300 to contact the measurement device 210 to obtain the first measurement value $c_1'$. The first measurement value $c_1'$ is transmitted from the data transmitting module 230 to the controller 30. The controller 30 then controls the drive mechanism 13 to drive the workpiece 300 a distance L' in the direction of the $Y_m^1$ axis of the predicted coordinate system $T_m^1$, and causes the processing plane 320 of the workpiece 300 to contact the measurement device 210 at a second point to obtain the second measurement value $c_2'$. The second measurement value $c_2'$ is transmitted from the data transmitting module 230 to the controller 30. Therefore, as the workpiece is moved a distance L' in the direction of the $Y_m^1$ axis, the distance change of the processing plane 320 in the direction perpendicular to the $Y_m^1$ axis is $\Delta c'=c_2'-c_1'$. The measured distance change indicates the $Y_m^1$ axis of the predicted workpiece coordinate system $T_m^1$ is not aligned with the actual processing plane 320, and that there exists an orientation error $\Delta R_x^1$ (a required angular change in the rotation of the predicted workpiece coordinate system $T_m^1$ around the $X_m^1$ axis). The value of $\Delta R_x^1$ can be calculated by the formula $\tan\Delta R_x^1=(c_2'-c_1')/L'$.

In block 107, the parameters ($R_x'$, $R_y'$, $R_z'$) of the predicted workpiece coordinate system $T_m^1$ are corrected according to $\Delta R_x^1$, and the predicted workpiece coordinate system $T_m^1$ is redefined. In the embodiment, the value of ($R_x'$, $R_y'$, $R_z'$) in the controller 30 is modified to rotate the predicted workpiece coordinate system $T_m^1$ around its $X_m^1$ axis by an angular amount $\Delta R_x^1$, thereby causing the $Y_m^1$ axis to become parallel to the actual processing plane 320. Therefore, the predicted workpiece coordinate system $T_m^1$ is modified to be a new predicted workpiece coordinate system $T_m^2$ (the second new predicted workpiece coordinate system) in which the the new $X_m$-$Y_m$ plane is parallel to the U-V plane of the actual workpiece coordinate system $T_g$. The origin of the predicted workpiece coordinate system $T_m^2$ is $P_m^2$, and the axes of the predicted workpiece coordinate system $T_m^2$ are $X_m^2$, $Y_m^2$ and $Z_m^2$, wherein the parameter in controller 30 is ($X_m^2$, $Y_m^2$, $Z_m^2$, $R_x^2$, $R_y^2$, $R_z^2$), the position error between the predicted workpiece coordinate system $T_m^2$ and the actual workpiece coordinate system $T_g$ is ($\Delta x^2$, $\Delta y^2$, $\Delta z^2$), and the orientation error between the predicted workpiece coordinate system $T_m^2$ and the actual workpiece coordinate system $T_g$ is ($\Delta^2$, $\Delta R_y^2$, $\Delta R_z^2$).

In block 108, the controller determines if the measured distance change $\Delta c'$ is larger than the maximum allowable position deviation. If the distance change $\Delta c'$ is larger than the maximum allowable position deviation, then block 106 to block 108 is repeated. When repeating block 106 to block 108, the direction for measuring distance change, $\Delta c'$ may not be perpendicular to the new $Y_m^1$ axis, but the angular error has become very small such that it can be approximated by the formula $\tan\Delta R_x^1 \sim (c_2'-c_1')/L'$. By repeatedly correcting the parameters ($R_x^1$, $R_y^1$, $R_z^1$) of the predicted workpiece coordinate system $T_m^1$ according to $\Delta R_x^1$, the distance change $\Delta c'$ will continue to decrease. If the distance change $\Delta c'$ is less than or equal to the maximum allowable position deviation, then the calibration procedure enters block 109. In this embodiment, the maximum allowable position deviation for $\Delta c'$ is 0.02 mm.

Figure 8:
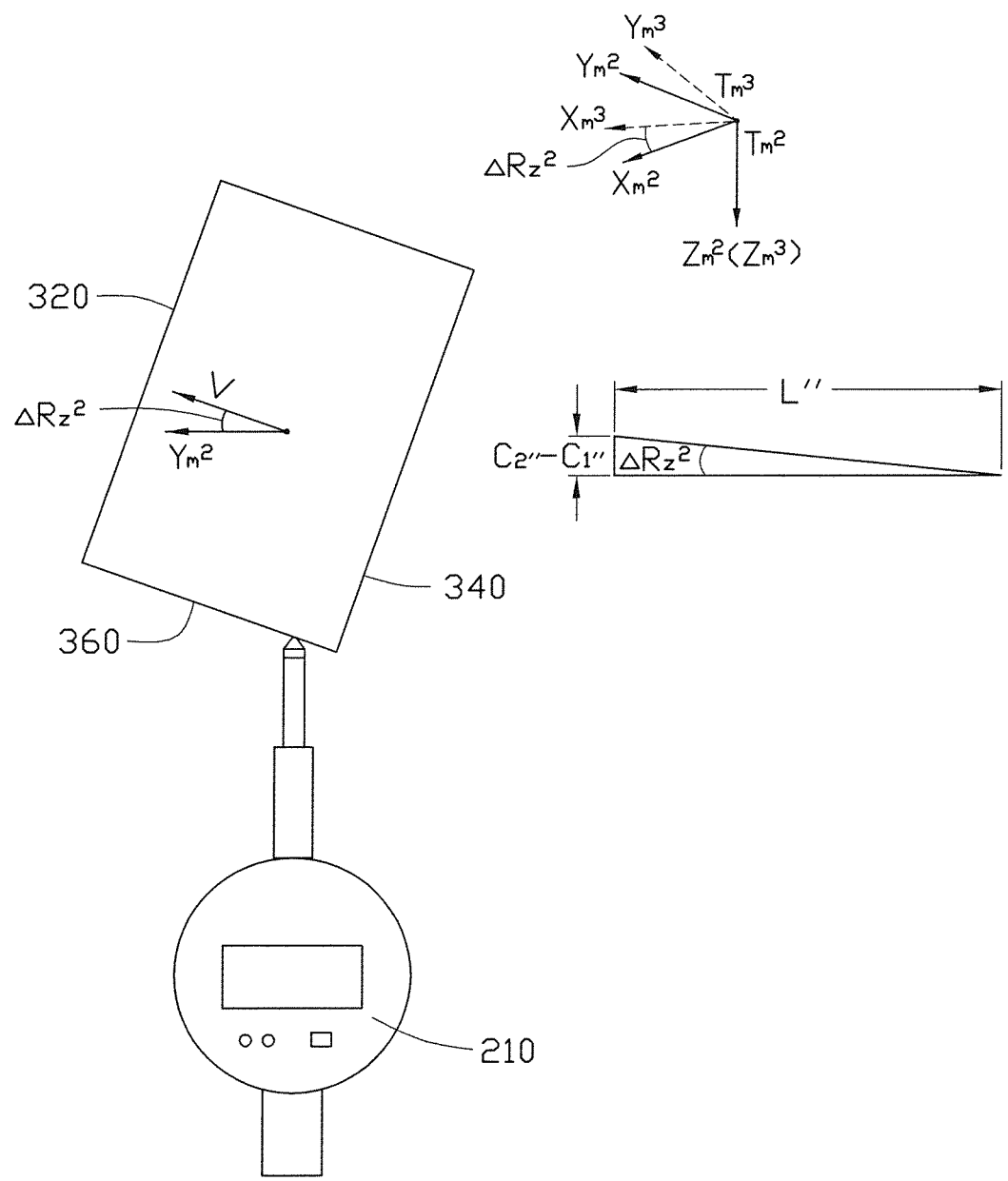
FIG. 8 illustrate a diagrammatic view of the robot manipulator of FIG. 4 when the drive mechanism drives the workpiece along axis $Y_m^2$ of the predicted coordinate system $T_m^2$.

FIG. 8 and block 109 in FIG. 2 illustrate that the drive mechanism 13 is controlled by the controller 30 to drive the workpiece 300 to move in the direction of the $Y_m^2$ axis of the predicted workpiece coordinate system $T_m^2$. The distance change from the movement of the second side plane 360 is measured to determine $\Delta R_z^2$. In the embodiment, the controller 30 is configured to control the drive mechanism 13 to drive the second side plane 360 of the workpiece 300 to contact the measurement device 210 to obtain the first measurement value $c_1''$. The first measurement value $c_1''$ is transmitted from the data transmitting module 230 to the controller 30. The controller 30 then controls the drive mechanism 13 to drive the workpiece 300 a distance L" in the direction of the $Y_m^2$ axis of the predicted workpiece coordinate system $T_m^2$, and causes the second side plane 360 of the workpiece 300 to contact the measurement device 210 at a second point to obtain the second measurement value $c_2''$. The second measurement value $c_2''$ is transmitted from the data transmitting module 230 to the controller 30. Therefore, as the workpiece is moved a distance L" in the direction of the $Y_m^2$ axis, the distance change of the second side plane 360 in the direction perpendicular to the $Y_m^2$ axis is $\Delta c''=c_2''-c_1''$. The measured distance change indicates the $Y_m^2$ axis of the predicted workpiece coordinate system $T_m^2$ is not aligned with the actual second side plane 360, and that there exists an orientation error $\Delta R_z^2$ (a required angular change in the rotation of the predicted workpiece coordinate system $T_m^2$ around the $Z_m^2$ axis). The value of $\Delta R_z^2$ can be calculated by the formula $\tan\Delta R_z^2=(c_2''-c_1'')/L''$.

In some embodiments, the controller 30 controls the drive mechanism 13 to drive the first side plane 340 of the workpiece 300 to contact the measurement device, and moves the workpiece in the direction of the $X_m^2$ axis of the predicted workpiece coordinate system $T_m^2$. The distance change from the movement of the first side plane 340 is measured to determine $\Delta R_z^2$.

In block 110, the parameters ($R_x^2$, $R_y^2$, $R_z^2$) of the predicted workpiece coordinate system $T_m^2$ are corrected according to $\Delta R_z^2$, and the predicted workpiece coordinate system $T_m^2$ is redefined. In the embodiment, the value of ($R_x^2$, $R_y^2$, $R_z^2$) in the controller 30 is modified to rotate the predicted workpiece coordinate system $T_m^2$ around its $Z_m^2$ axis by an angular amount thereby causing the $Y_m^2$ axis to become parallel to the second side plane 360, and at the same time causing the $X_m^2$ axis to become parallel to the first side plane 340. Therefore, this modification of the ($R_x^2$, $R_y^2$, $R_z^2$) parameters causes the $X_m^2$ axis of the predicted workpiece coordinate system $T_m^2$ to become parallel to the U axis of the actual workpiece coordinate system $T_g$, and the $Y_m^2$ axis of the predicted workpiece coordinate system $T_m^2$ to become parallel to the V axis of the actual workpiece coordinate system $T_g$. The predicted workpiece coordinate system $T_m^2$ is modified to be a new predicted workpiece coordinate system $T_m^3$ (the third new predicted workpiece coordinate system). The origin of the new predicted workpiece coordinate system $T_m^3$ is $P_m^3$, and the axes of the new predicted workpiece coordinate system $T_m^3$ are $X_m^3$, $Y_m^3$ and $Z_m^3$, wherein the parameter in controller 30 is ($X_m^3$, $Y_m^3$, $Z_m^3$, $R_x^3$, $R_y^3$, $R_z^3$), the position error between the predicted workpiece coordinate system $T_m^3$ and the actual workpiece coordinate system $T_g$ is ($\Delta x^3$, $\Delta y^3$, $\Delta z^3$), and the orientation error between the predicted workpiece coordinate system $T_m^3$ and the actual workpiece coordinate system $T_g$ is ($\Delta R_x^3$, $\Delta R_y^3$, $\Delta R_z^3$). The $X_m^3$ axis, the $Y_m^3$ axis and the $Z_m^3$ axis are respectively parallel to the U axis, the V axis and the W axis of the actual workpiece coordinate system $T_g$, that is, $\Delta R_x^3=0$, $\Delta R_y^3=0$, $\Delta R_z^3=0$, but the origin $P_{m3}$ and the origin $P_m$ are at the same un-corrected position relative to $T_0$.

In block 111, the controller 30 determines if the measured distance change $\Delta c''$ is larger than the maximum allowable position deviation. If the distance change $\Delta c''$ is larger than the maximum allowable position deviation, then block 109 to block 111 is repeated. When repeating block 109 to block 111, the direction for measuring distance change $\Delta c''$ may not be perpendicular to the new $Y_m^2$ axis, but the angular error has become very small such that it can be approximated by the formula $\tan\Delta R_x^2 \sim (c_2''-c_1'')/L''$. By repeatedly correcting the ($R_x^2$, $R_y^2$, $R_z^2$) parameters of the predicted coordinate system $T_m^2$ according to $\Delta R_z^2$, the distance change $\Delta c''$ will continue to decrease. If the distance change $\Delta c''$ is less than or equal to the maximum allowable position deviation, then the calibration procedure enters block 112. In this embodiment, the maximum allowable position deviation for $\Delta c''$ is 0.02 mm.

Figure 9:
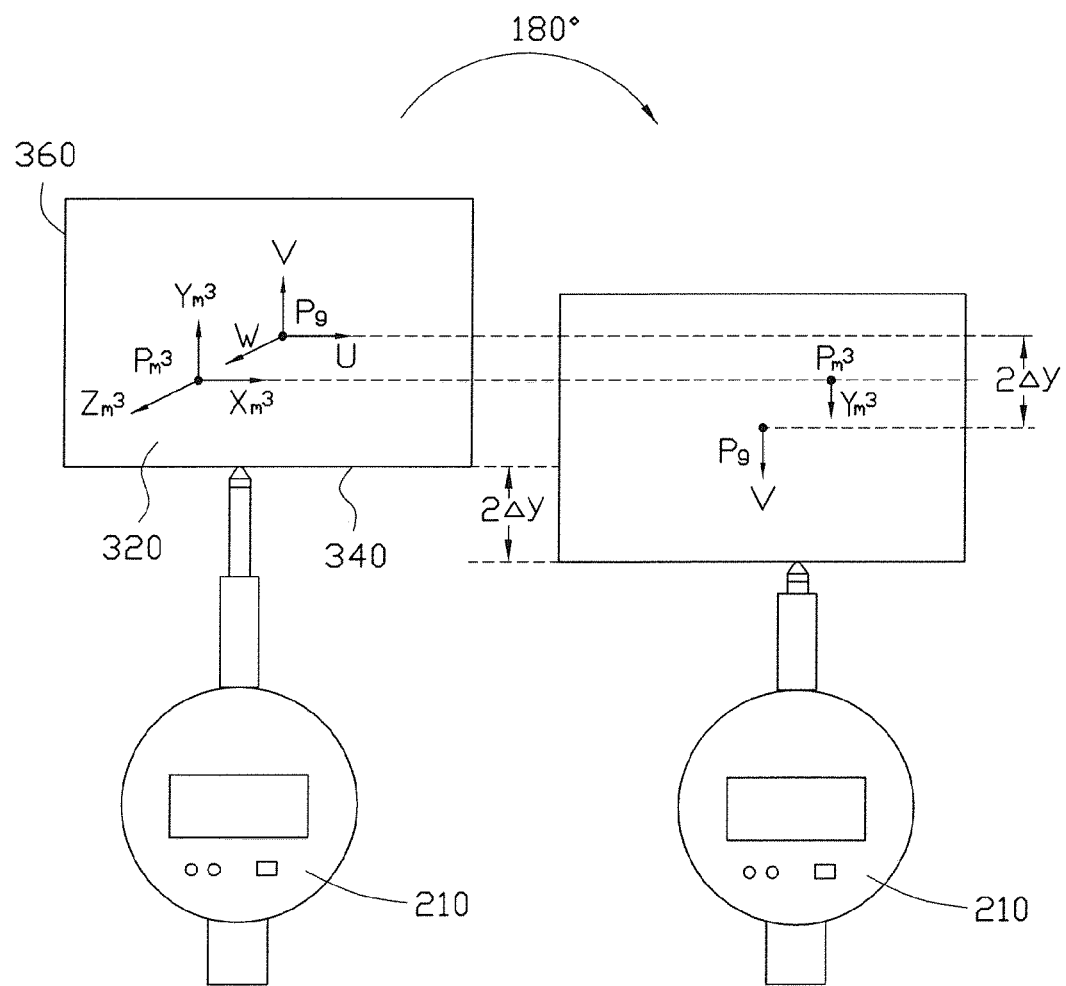
FIG. 9 illustrates a diagrammatic view of the robot manipulator of FIG. 4 when the drive mechanism drives the workpiece such that the first side plane faces the measurement device and then rotates the workpiece by 180 degrees around the axis $Z_m^3$.

FIG. 9 and block 112 in FIG. 2 illustrate that the drive mechanism 13 is controlled by the controller 30 to drive the workpiece 300 in such a way that the $Y_m^3$ axis of the predicted workpiece coordinate system $T_m^3$ is parallel to the distance measurement direction and then rotate the workpiece 300 by 180 degrees around the $Z_m^3$ axis. The distance change from rotation of the first side plane 340 is measured to determine $\Delta y$. In the embodiment, the controller 30 is configured to control the drive mechanism 13 to drive the first side plane 340 of the workpiece 300 to contact the measurement device 210 to obtain the first measurement value $d_1$. The measurement value $d_1$ is transmitted from the data transmitting module 230 to the controller 30. The controller then controls the drive mechanism 13 to raise the workpiece 300 by a height H to avoid colliding with the measurement device 210 when rotating the workpiece. The controller then controls the drive mechanism to rotate the workpiece 300 by 180 degrees around the $Z_m^3$ axis of the predicted coordinate system $T_m^3$. The controller 30 again controls the drive mechanism 13 to lower the workpiece 300 by a height H and causes the opposite first side plane 340 of the workpiece 300 to contact the measurement device 210 to obtain a second measurement value $d_2$. The measurement value $d_2$ is transmitted from the data transmitting module 230 to the controller 30. The distance change after movement of the workpiece 300 is $\Delta d = d_2 - d_1$. The measured distance change indicates the origin $P_m^3$ of the predicted coordinate system $T_m^3$ is not at the center of the workpiece 300 (where the origin $P_g$ of the actual workpiece coordinate system is located), and that there exists a position error $\Delta y$ (a required shift of the origin $P_m^3$ along the $Y_m^3$ axis in the predicted workpiece coordinate system $T_m^3$). $\Delta y$ can be calculated based on the formula $2\Delta y = d_2 - d_1$ or $\Delta y = (d_2 - d_1)/2$.

In block 113, the parameters $(X_m^3, Y_m^3, Z_m^3)$ of the predicted workpiece coordinate system $T_m^3$ is corrected according to $\Delta y$, and the predicted workpiece coordinate system $T_m^3$ is redefined. In the embodiment, the value of $(X_m^3, Y_m^3, Z_m^3)$ is modified in the controller 30 to move the position of $P_m^3$ of the predicted workpiece coordinate system $T_m^3$ along the $Y_m^3$ axis by an amount $\Delta y$. The predicted workpiece coordinate system $T_m^3$ is modified to be a new predicted workpiece coordinate system $T_m^4$ (the fourth new predicted coordinate system). The origin of the new predicted workpiece coordinate system $T_m^4$ is $P_m^4$, and the axes of the new predicted workpiece coordinate system $T_m^4$ are $X_m^4, Y_m^4$ and $Z_m^4$, wherein the parameter in controller 30 is $(X_m^4, Y_m^4, Z_m^4, R_x^4m, R_y^4, R_z^4)$ the position error between the predicted workpiece coordinate system $T_m^4$ and the actual workpiece coordinate system $T_g$ is $(\Delta x^4, \Delta y^4, \Delta z^4)$, and the orientation error between the predicted workpiece coordinate system $T_m^4$ and the actual workpiece coordinate system $T_g$ is $(\Delta R_x^4, \Delta R_y^4, \Delta R_z^4)$ wherein $\Delta y^4=0$, $\Delta R_x^4=0$, $\Delta R_y^4=0$, $\Delta R_z^4=0$.

When the first side plane 340 of the workpiece 300 is not strictly perpendicular to the direction of distance measurement, block 112 to block 113 are repeated to increase the precision of the calibration.

Figure 10:
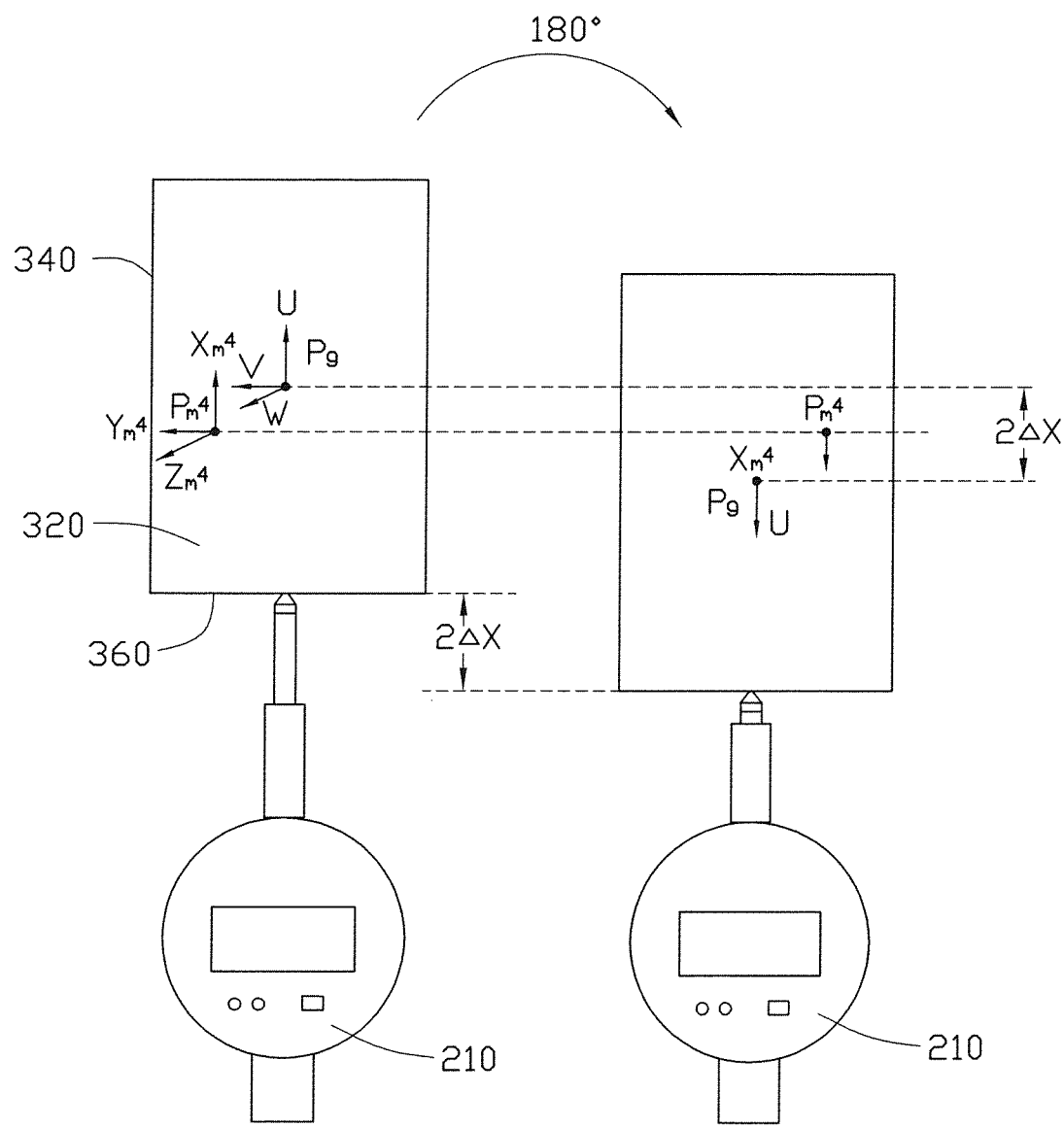
FIG. 10 illustrates a diagrammatic view of the robot manipulator of FIG. 4 when the drive mechanism drives the workpiece such that the second side plane faces the measurement device and then rotates the workpiece by 180 degrees around the axis $Z_m^4$.

FIG. 10 and block 114 in FIG. 2 illustrate that the drive mechanism 13 is controlled by the controller 30 to drive the workpiece 300 in such a way that the $X_m^4$ axis of the predicted workpiece coordinate system $T_m^4$ is parallel to the distance measurement direction and then rotate the workpiece 300 by 180 degrees around the $Z_m^4$ axis. The distance change from rotation of the second side plane 360 is measured to determine $\Delta x$. In the embodiment, the controller 30 is configured to control the drive mechanism 13 to drive the second side plane 360 of the workpiece 300 to contact the measurement device 210 to obtain the first measurement value $d_1'$. The measurement value $d_1'$ is transmitted from the data transmitting module 230 to the controller 30. The controller then controls the drive mechanism 13 to raise the workpiece 300 by a height H' to avoid colliding with the measurement device 210 when rotating the workpiece. The controller then controls the drive mechanism to rotate the workpiece 300 by 180 degrees around the $Z_m^4$ axis of the predicted coordinate system $T_m^4$. The controller 30 again controls the drive mechanism 13 to lower the workpiece 300 by a height H' and cause the opposite second side plane 360 of the workpiece 300 to contact the measurement device 210 to obtain a second measurement value $d_2'$. The measurement value $d_2'$ is transmitted from the data transmitting module 230 to the controller 30. The distance change after the movement of the workpiece 300 is $\Delta d' = d_2' - d_1'$. The measured distance change indicates the origin $P_m^4$ of the predicted coordinate system $T_m^4$ is not at the center of the workpiece 300, and that there exists a position error $\Delta x$ (a required shift of the origin $P_m^4$ along the $X_m^4$ axis in the predicted workpiece coordinate system $T_m^4$). $\Delta x$ can be calculated based on the formula $2\Delta x = d_2' - d_1'$ or $\Delta x = (d_2' - d_1')/2$.

In block 115, the parameters $(X_m^4, Y_m^4, Z_m^4)$ of the predicted workpiece coordinate system $T_m^4$ is corrected according to $\Delta x$, and the predicted workpiece coordinate system $T_m^4$ is redefined In the embodiment, the value of $(X_m^4, Y_m^4, Z_m^4)$ in the controller 30 is modified to move the position of $P_m^4$ of the predicted workpiece coordinate system $T_m^4$ along the $X_m^4$ axis by an amount $\Delta x$. The predicted workpiece coordinate system $T_m^4$ is modified to be a new predicted workpiece coordinate system $T_m^5$ (the fifth new predicted coordinate system). The origin of the new predicted coordinate system $T_m^5$ is $P_m^5$, and the axes of the new predicted workpiece coordinate system $T_m^5$ are $X_m^5, Y_m^5$ and $Z_m^5$, wherein the parameter in controller 30 is $(X_m^5, Y_m^5, Z_m^5, R_x^5, R_y^5, R_z^5)$, the position error between the predicted workpiece coordinate system $T_m^5$ and the actual workpiece coordinate system $T_g$ is $(\Delta x^5, \Delta y^5, \Delta z^5)$, and the orientation error between the predicted workpiece coordinate system $T_m^5$ and the actual workpiece coordinate system $T_g$ is $(\Delta R_x^5, \Delta R_y^5, \Delta R_z^5) = (0,0,0)$, wherein $\Delta x^5=0$, $\Delta y^5=0$.

When the second side plane 360 of the workpiece 300 is not strictly perpendicular to the direction of distance measurement, block 114 to block 115 are repeated to increase the precision of the calibration.

In some embodiments, when the measurement device 210 is a non-contact distance measurement device, such as laser distance sensor, it is not necessary to drive the workpiece 300 to rise or descend while measuring $(d_2-d_1)$ and $(d_2'-d_1')$.

In some embodiments, the controller can control the drive mechanism 13 to move the workpiece back to the original position after each measurement.

Figure 11:
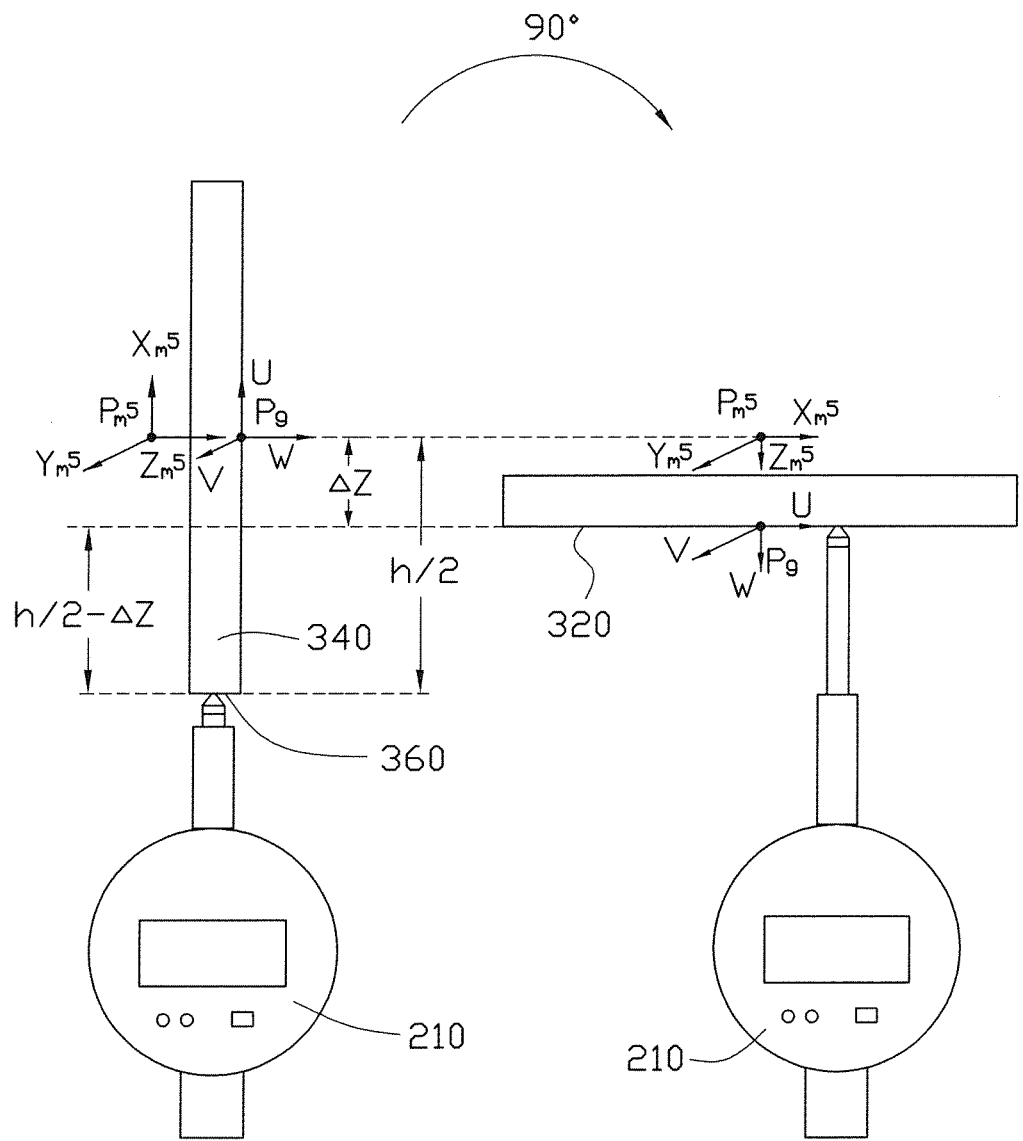
FIG. 11 illustrates a diagrammatic view of the robot manipulator of FIG. 4 when the drive mechanism drives the second side plane of the workpiece to contact the measurement device and then rotates the workpiece by −90 degrees around the axis $Y_m^5$.
Figure 12:
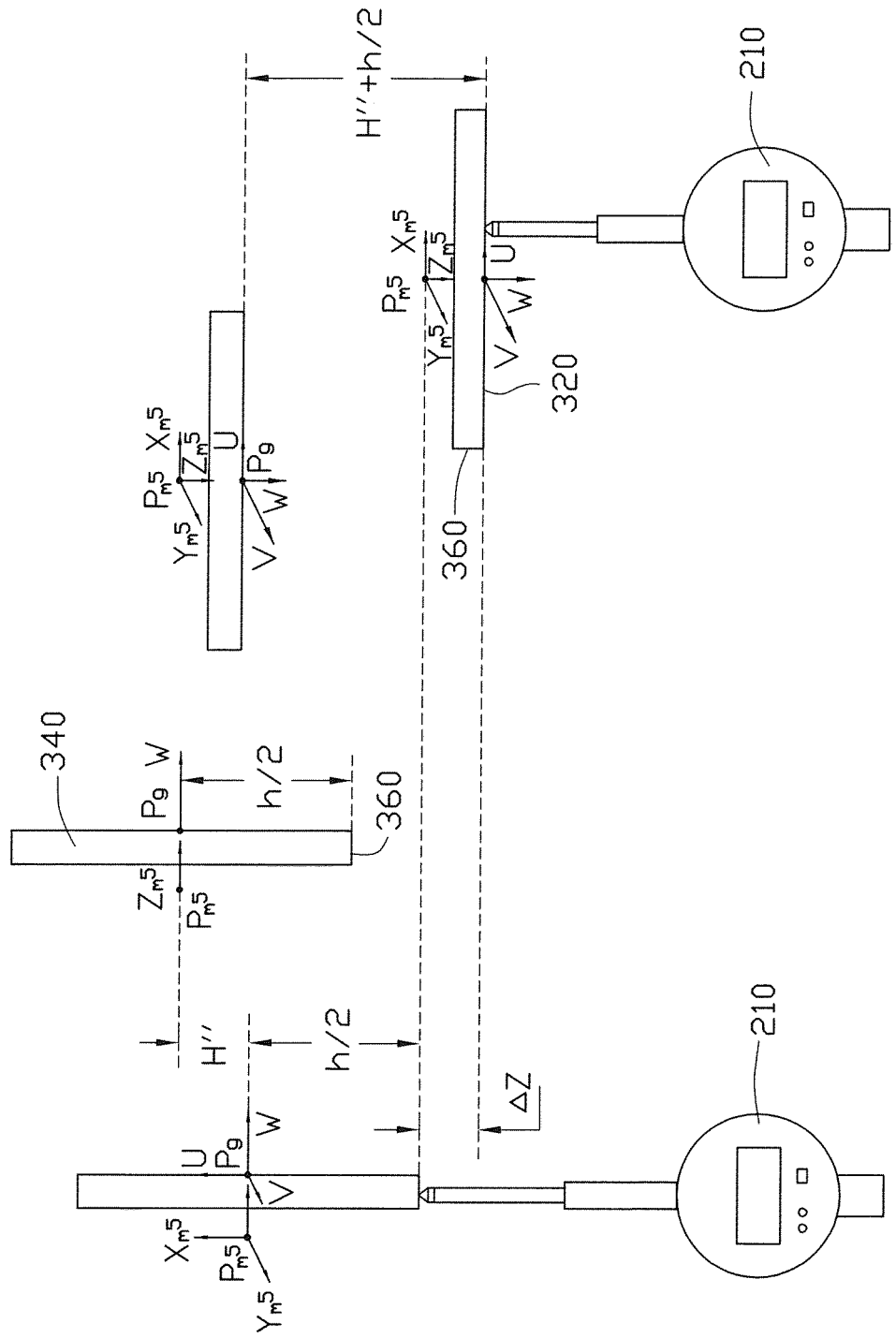
FIG. 12 illustrates another diagrammatic view of the robot manipulator of FIG. 4 when the drive mechanism drives the second side plane of the workpiece to contact the measurement device, then drives the workpiece a distance H" in the opposite direction of contact measurement, and lastly rotates the workpiece by −90 degrees around the axis $Y_m^5$.

FIG. 11, FIG. 12 and block 116 in FIG. 3 illustrate that the controller 30 is configured to control the drive mechanism 13 to drive the first side plane 340 of the workpiece 300 or the second side plane 360 of the workpiece 300 to contact the measurement device 210. The controller 30 then rotates the workpiece 300 around the $X_m^5$ axis (in case of contact with first side plane) or the $Y_m^5$ axis (in case of contact with second side plane) by −90 degrees and cause the processing plane 320 of the workpiece 300 to contact the measurement device 210 in order to determine Δz. FIG. 11 illustrates when the workpiece 300 is driven to cause the second side plane 360 to contact the measurement device 210; then the workpiece 300 is rotated around the $Y_m^5$ axis by −90 degrees; the measurement device 210 measures a distance change h/2−Δz (h is the length of the workpiece 300 along the U axis direction) from the two measurements.

In this embodiment, the controller 30 is configured to control the drive mechanism 13 to drive the second side plane 360 of the workpiece 300 to contact the measurement device 210 to obtain a first measurement value $d_1''$. The first measurement value $d_1''$ is transmitted from the data transmitting module 230 to the controller 30. The controller then controls the drive mechanism 13 to raise the workpiece 300 by a height H" to avoid damaging the measurement device 210 when rotating the workpiece. The controller then controls the drive mechanism to rotate the workpiece 300 by −90 degrees around the $Y_m^5$ axis of the predicted coordinate system $T_m^5$. The controller 30 again controls the drive mechanism 13 to lower the workpiece 300 by a height (H"+h/2) and cause the processing plane 320 of the workpiece 300 to contact the measurement device 210 to obtain a second measurement value $d_2''$. The second measurement value $d_2''$ is transmitted from the data transmitting module 230 to the controller 30. The distance change after the movement of the workpiece 300 is $\Delta d''=d_2''-d_1''$. The measured distance change indicates the origin $P_m^5$ of the predicted coordinate system $T_m^5$ is not on the processing plane 320 of the workpiece 300, and that there exists a position error Δz (a required shift of the origin $P_m^5$ along the $Z_m^5$ axis in the predicted workpiece coordinate system $T_m^5$). Δz can be calculated based on the formula $\Delta z=d_2''-d_1''$.

In another embodiment, the controller 30 is configured to control the drive mechanism 13 to drive the first side plane 340 of the workpiece 300 to contact the measurement device 210 to obtain the first measurement value. The controller then controls the drive mechanism to raise the workpiece 300 by a height H" and then rotate the workpiece 300 by −90 degrees around the $X_m^5$ axis of the predicted coordinate system $T_m^5$. The controller 30 again controls the drive mechanism 13 to lower the workpiece by a distance (H"+w/2), where w is the length of the workpiece 300 along the V axis, and cause the processing plane 320 of the workpiece 300 to contact the measurement device 210 to obtain the second measurement value.

In some embodiments, when the measurement device 210 is a non-contact distance measurement device, such as laser distance sensor, it is not necessary to drive the workpiece 300 to rise or descend. The controller can control the drive mechanism to directly rotate the workpiece 300 by −90 degrees around the $Y_m^5$ axis or the $X_m^5$ axis of the predicted coordinate system $T_m^5$. In case of rotation around the $Y_m^5$ axis, the distance change measured by the measurement device 210 is $\Delta d''=h/2-\Delta z$ which means $\Delta z=h/2-\Delta d''$. In case of rotation around the $X_m^5$ axis, the distance change measured by the measurement device 210 is $\Delta d''=w/2-\Delta z$ which means $\Delta z=h/2-\Delta d''$.

In block 117, the parameters ($X_m^5$, $Y_m^5$, $Z_m^5$) of the predicted workpiece coordinate system $T_m^5$ is modified according to Δz, and the predicted workpiece coordinate system $T_m^5$ is redefined. In the embodiment, the value of ($X_m^5$, $Y_m^5$, $Z_m^5$) in the controller 30 is modified to move the position of $P_m^5$ of the predicted workpiece coordinate system $T_m^5$ along the $Z_m^5$ axis by an amount Δz. The predicted workpiece coordinate system $T_m^5$ is modified to be a new predicted workpiece coordinate system $T_m^6$ (the calibrated workpiece coordinate system). The origin of the calibrated workpiece coordinate system $T_m^6$ is $P_m^6$, and the axes of the calibrated workpiece coordinate system $T_m^6$ are $X_m^6$, $Y_m^6$ and $Z_m^6$, wherein the parameter in controller 30 is ($X_m^6$, $Y_m^6$, $Z_m^6$, $R_x^6$, $R_y^6$, $R_z^6$). The origin of the calibrated workpiece coordinate system $T_m^6$ is located at the center of the workpiece on the processing plane 320, and the axes of the calibrated workpiece coordinate system $T_m^6$ are aligned with the U, V, W axes of the actual workpiece coordinate system $T_g$, hence the calibration process is complete.

In some embodiments, the axes of the predicted workpiece coordinate system $T_m$ are not parallel to the axes of the basic coordinate system $T_0$.

In some embodiments, when calibrating the axes of the predicted workpiece coordinate system, $\Delta R_x$ can be determined first. When calibrating the origin of the predicted workpiece coordinate system, Δx can be determined first.

The calibration method for the workpiece coordinate system of the robot manipulator 100 is based on setting the predicted workpiece coordinate system on the workpiece 300. The controller 30 controls the drive mechanism 13 to move the workpiece 300 t along the axes of the predicted workpiece coordinate system to determine orientation errors. The measurement device 210 is configured to measure distance changes after the movement of the workpiece 300 and the orientation errors ($\Delta R_y$, $\Delta R_x^1$, $\Delta R_z^2$) between the predicted workpiece coordinate system and the actual workpiece coordinate system are calculated from the distance changes. If the distance change (Δc, Δc' or Δc") is greater than the maximum allowable position deviation, the controller 30 repeats the associated calibration steps until the distance change (Δc, Δc' or Δc") is less than or equal to the maximum allowable position deviation.

The controller 30 controls the drive mechanism 13 to rotate the workpiece 300 around the axes of the predicted workpiece coordinate system to determine position errors. The measurement device 210 is configured to measure distance changes after the movement of the workpiece 300 and the position errors (Δx,Δy,Δz) between the predicted workpiece coordinate system and the actual workpiece coordinate system are calculated from the distance changes.

The calibration method can be used for applications where the robot manipulator 100 holds the workpiece 300 during machining processes. The robot manipulator can rotate the workpiece around the calibrated workpiece coordinate axes to machine the workpiece from multiple angles, as well as move the workpiece to different tools to perform multi-procedure machining process.

In some embodiments, block 105, block 108 and block 111 can be ignored.

The embodiments shown and described above are only examples. Many details are often found in the art such as the other features of a calibration method for a robot manipulator, and particularly for a coordinate system of the robot manipulator. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A calibration method for a coordinate system of a robot manipulator, the robot manipulator comprises a drive mechanism, a controller configured to control the drive mechanism, a tool assembled to a distal end of the drive mechanism, the distal end of the drive mechanism having a basic coordinate system; an assistant measurement tool comprises a measurement device; a workpiece comprises an attachment plane coupled with the tool, a processing plane at the opposite side of the attachment plane, a first side plane and a second side plane connected to the attachment plane and the processing plane, the calibration method comprising:

A. making the processing plane of the workpiece face toward the measurement device;
   B. setting a predicted coordinate system $(X_m, Y_m, Z_m, R_x, R_y, R_z)$ on the workpiece with assumed position errors $(\Delta x, \Delta y, \Delta z)$ and assumed orientation errors $(\Delta R_x, \Delta R_y, \Delta R_z)$ between the predicted coordinate system and an actual coordinate system;
   C. controlling the drive mechanism to drive the workpiece a distance L in the direction of an $X_m$ axis in the predicted coordinate system and measuring a distance change from a movement of the processing plane of the workpiece to obtain $\Delta R_y$ via the measurement device;
   D. modifying the value of $(R_x, R_y, R_z)$ in the predicted coordinate system according to $\Delta R_y$, and redefining the predicted coordinate system as a first new predicted coordinate system $(X_m^1, Y_m^1, Z_m^1, R_x^1, R_y^1, R_z^1)$ with a position error $(\Delta x^1, \Delta y^1, \Delta z^1)$ and an orientation error $(\Delta R_x^1, \Delta R_y^1, \Delta R_z^1)$ between the predicted coordinate system and the actual coordinate system;
   E. controlling the drive mechanism to drive the workpiece a distance L' in the direction of an $Y_m^1$ axis in the first new predicted coordinate system and measuring the distance change from the movement of the processing plane of the workpiece to obtain $\Delta R_x^1$ via the measurement device;
   F. modifying the value of $(R_x^1, R_y^1, R_z^1)$ in the predicted coordinate system according to $\Delta R_x^1$, and redefining the predicted coordinate system as a second new predicted coordinate system $(X_m^2, Y_m^2, Z_m^2, R_x^2, R_y^2, R_z^2)$ with a position error $(\Delta x^2, \Delta y^2, \Delta z^2)$ and an orientation error $(\Delta R_x^2, \Delta R_y^2, \Delta R_z^2)$ between the predicted coordinate system and the actual coordinate system;
   G. controlling the drive mechanism to drive the workpiece a distance L" in the direction of an $X_m^2$ axis or an $Y_m^2$ axis in the second new predicted coordinate system and measuring the distance change from the movement of the first side plane of the workpiece or the movement of the second side plane of the workpiece to obtain $\Delta R_z^2$ via the measurement device;
   H. modifying the value of $(R_x^2, R_y^2, R_z^2)$ in the predicted coordinate system according to $\Delta R_z^2$, and redefining the predicted coordinate system as a third new predicted coordinate system $(X_m^3, Y_m^3, Z_m^3, R_x^3, R_y^3, R_z^3)$ with a position error $(\Delta x^3, \Delta y^3, \Delta z^3)$ and an orientation error $(\Delta R_x^3, \Delta R_y^3, \Delta R_z^3)$ between the predicted coordinate system and the actual coordinate system;
   I. controlling the drive mechanism by the controller to drive the workpiece to rotate by 180 degrees around an axis $Z_m^3$ in the third new predicted coordinate system and measuring the distance change between one point of the first side plane before being rotated and another point of the first side plane after being rotated to obtain $\Delta y^3$;
   J. modifying the value of $(X_m^3, Y_m^3, Z_m^3)$ in the predicted coordinate system according to $\Delta y^3$ and redefining the predicted coordinate system as a fourth new predicted coordinate system $(X_m^4, Y_m^4, Z_m^4, R_x^4, R_y^4, R_z^4)$ with a position error $(\Delta x^4, \Delta y^4, \Delta z^4)$ and an orientation error $(\Delta R_x^4, \Delta R_y^4, \Delta R_z^4)$ between the predicted coordinate system and the actual coordinate system;
   K. controlling the drive mechanism by the controller to drive the workpiece to rotate by 180 degrees around an axis $Z_m^4$ in the fourth new predicted coordinate system, and measuring the distance change between one point of the second side plane before being rotated and another point of the second side plane after being rotated to obtain $\Delta x^4$;
   L. modifying the parameter of $(X_m^4, Y_m^4, Z_m^4)$ in the predicted coordinate system according to $\Delta x^4$ and redefining the predicted coordinate system as a fifth new predicted coordinate system $(X_m^5, Y_m^5, Z_m^5, R_x^5, R_y^5, R_z^5)$ with a position error $(\Delta x^5, \Delta y^5, \Delta z^5)$ and an orientation error $(\Delta R_x^5, \Delta R_y^5, \Delta R_z^5)$ between the predicted coordinate system and the actual coordinate system;
   M. controlling the drive mechanism by the controller to drive the workpiece to rotate by −90 degrees around an axis $Y_m^5$ in the fifth new predicted coordinate system and measuring the distance change between one point of the second side plane before being rotated and another point of the processing plane after being rotated to obtain $\Delta z^5$;
   N. modifying the value of $(X_m^5, Y_m^5, Z_m^5)$ in the fifth predicted coordinate system according to $\Delta z^5$ and redefining the predicted coordinate system as a calibrated coordinate system $(X_m^6, Y_m^6, Z_m^6, R_x^6, R_y^6, R_z^6)$.

2. The calibration method of claim 1, wherein the assistant measurement tool further comprises a data transmitting module, wherein the data transmitting module is electrically coupled to the controller and configured to transmit measured data to the controller.

3. The calibration method of claim 1, wherein the controller is configured to control the drive mechanism to drive the second side plane of the workpiece to contact the measurement device to obtain the first measurement value $d_1"$, the drive mechanism drives the work piece to rise by a height H", the drive mechanism then rotates the workpiece by −90 degrees around an axis $Y_m^5$ of the predicted coordinate system $T_m^5$, the controller is configured to control the drive mechanism to descend by a height (H"+h/2) and drive the processing plane of the workpiece to contact the measurement device to obtain the second measurement value $d_2"$, the distance change after the movement of the work piece is $\Delta d" = d_2" - d_1"$, and $\Delta z^5 = d_2" - d_1"$.

4. The calibration method of claim 1, wherein measuring the distance change as $\Delta c$ occurs via the measurement device after steps C and D, and determining if $\Delta c$ is larger than a maximum allowable position deviation or not, if $\Delta c$ is larger than the maximum allowable position deviation, then repeating steps C and D for the calibration, if $\Delta c$ is less than or equal to the maximum allowable position deviation, then finishing the calibration of $\Delta R_y$ and going to step E.

5. The calibration method of claim 1, wherein measuring the distance change as $\Delta c'$ occurs via the measurement device after steps E and F, and determining if $\Delta c'$ is larger than a maximum allowable position deviation or not, if $\Delta c'$ is larger than the maximum allowable position deviation, then repeating the steps E and F for the calibration, if $\Delta c'$ is less than or equal to the maximum allowable position deviation, then finishing the calibration of $\Delta R_x^1$ and going to step G.

6. The calibration method of claim 1, wherein measuring the distance change as $\Delta c''$ occurs via the measurement device after the steps G and H, and determining if $\Delta c''$ is larger than a maximum allowable position deviation or not, if $\Delta c''$ is larger than the maximum allowable position deviation, then repeating steps G and H for the calibration. if $\Delta c''$ is less than or equal to the maximum allowable position deviation, then finishing the calibration of $\Delta R_z^2$ and going to step I.

7. The calibration method of claim 1, wherein the controller is configured to control the drive mechanism to move the workpiece back to an original starting location after ending each step steps C, E, G, I, K and M.

8. The calibration method of claim 1, wherein the drive mechanism is a multi-axis drive mechanism.

9. The calibration method of claim 1, wherein the measurement device is a digital indicator.

10. The calibration method of claim 1, wherein the measurement device is a mechanical indicator.

11. The calibration method of claim 1, wherein the measurement device is a laser displacement sensor.

12. The calibration method of claim 1, wherein the object held by a robot is a rectangular calibration block for a non-rectangular workpiece, with the calibration block has dimensions that replicate the rectangular external bounds of the actual workpiece.

\* \* \* \* \*